May 3, 1960 G. A. SWARTZ 2,935,227
CAPSULE FEEDING MECHANISM FOR PACKAGING MACHINES
Filed Aug. 27, 1958 5 Sheets-Sheet 1

INVENTOR.
GEORGE A. SWARTZ
BY
Harry B. Cook,
ATTORNEY

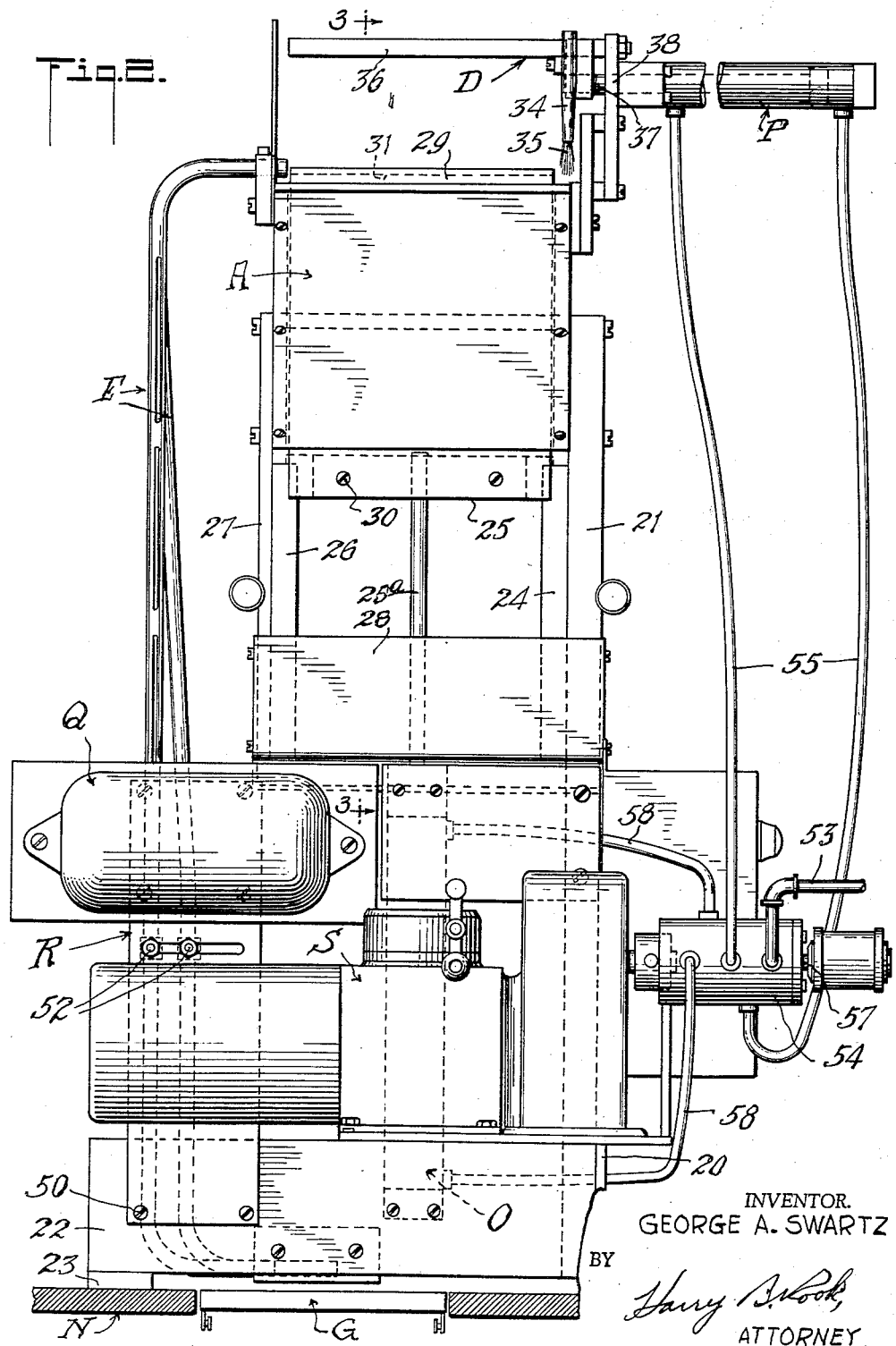

May 3, 1960 G. A. SWARTZ 2,935,227
CAPSULE FEEDING MECHANISM FOR PACKAGING MACHINES
Filed Aug. 27, 1958 5 Sheets-Sheet 3
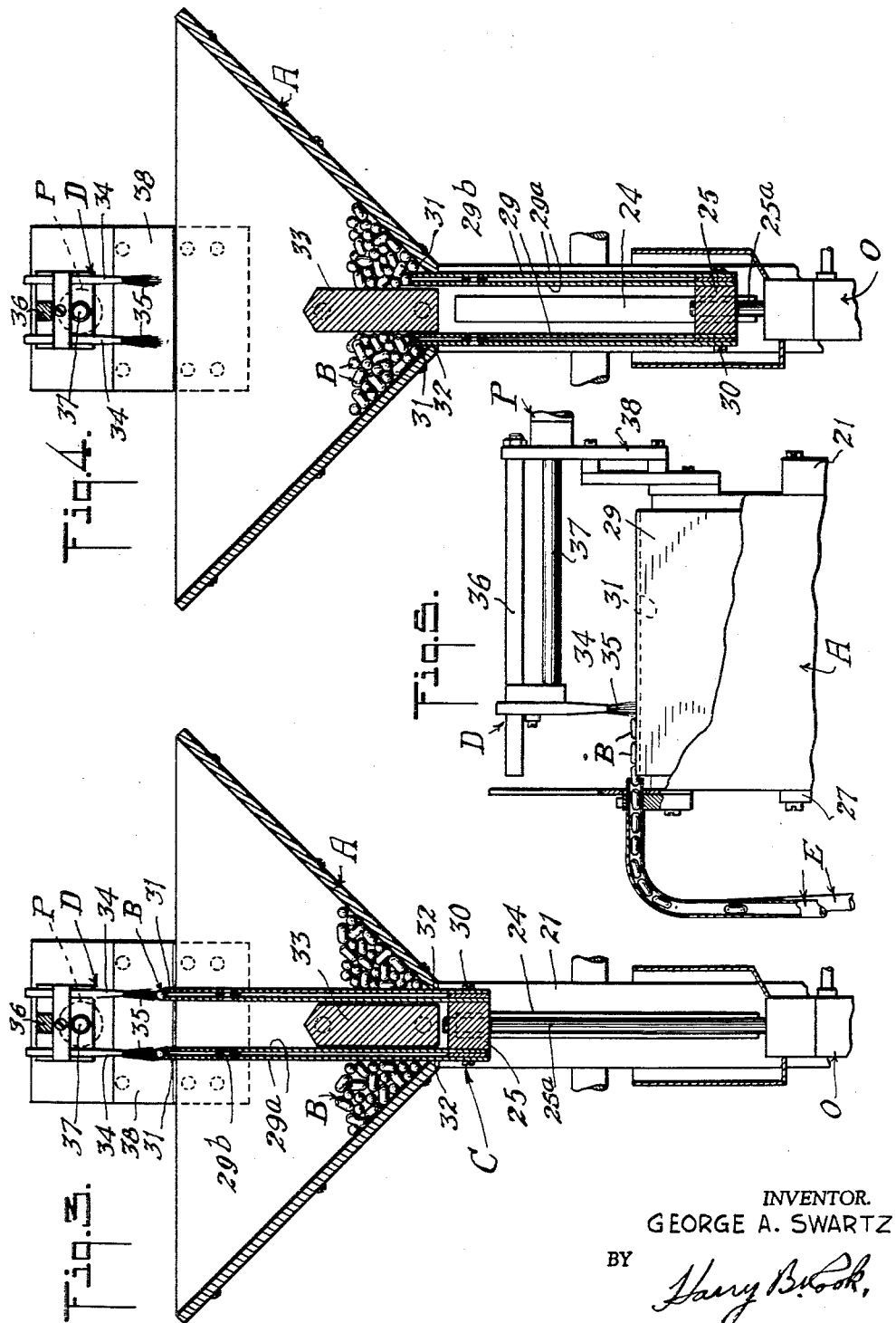
INVENTOR.
GEORGE A. SWARTZ
BY
Harry B. Cook,
ATTORNEY May 3, 1960  G. A. SWARTZ  2,935,227
CAPSULE FEEDING MECHANISM FOR PACKAGING MACHINES
Filed Aug. 27, 1958  5 Sheets-Sheet 4
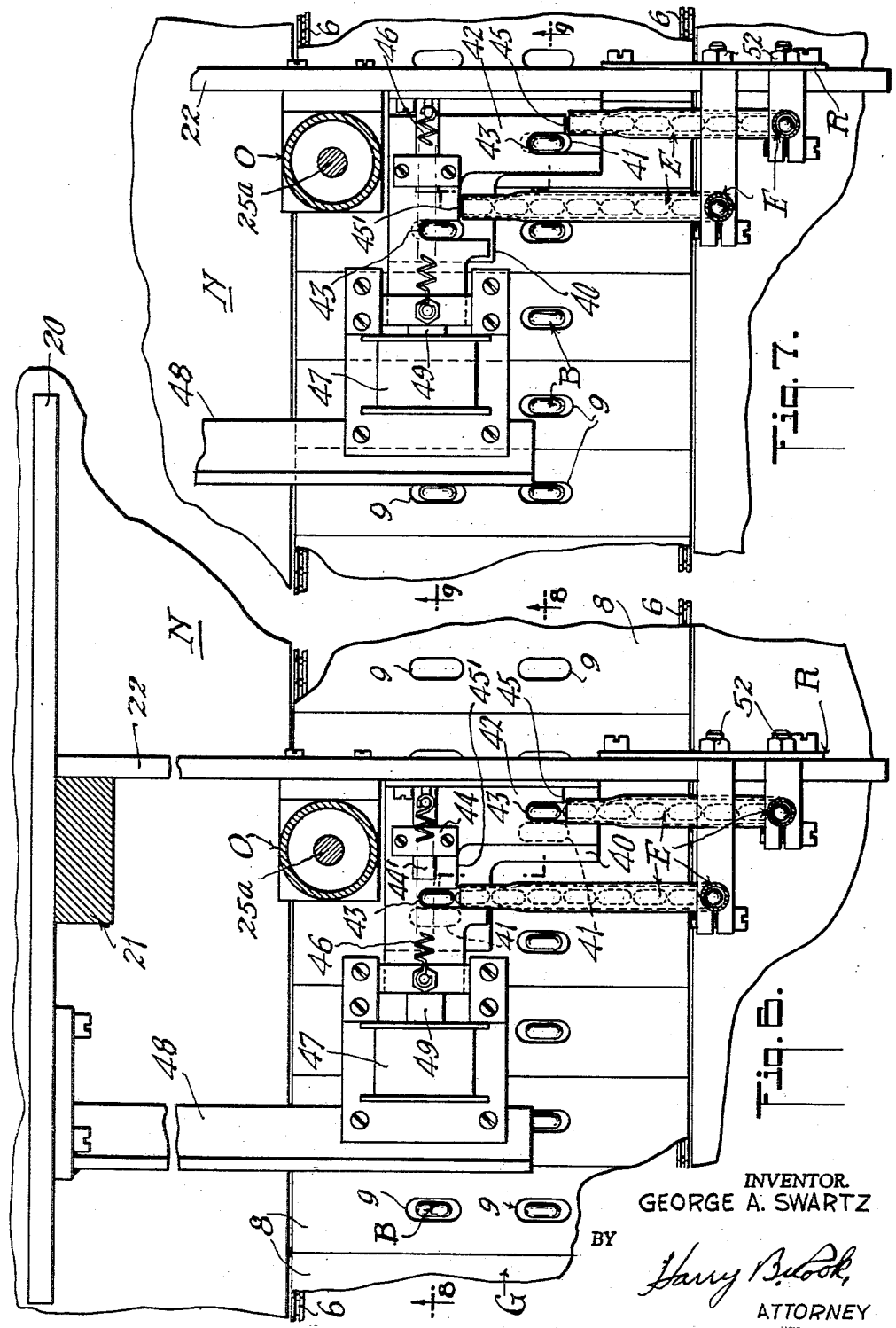
INVENTOR.
GEORGE A. SWARTZ
BY
Harry B. Cook,
ATTORNEY

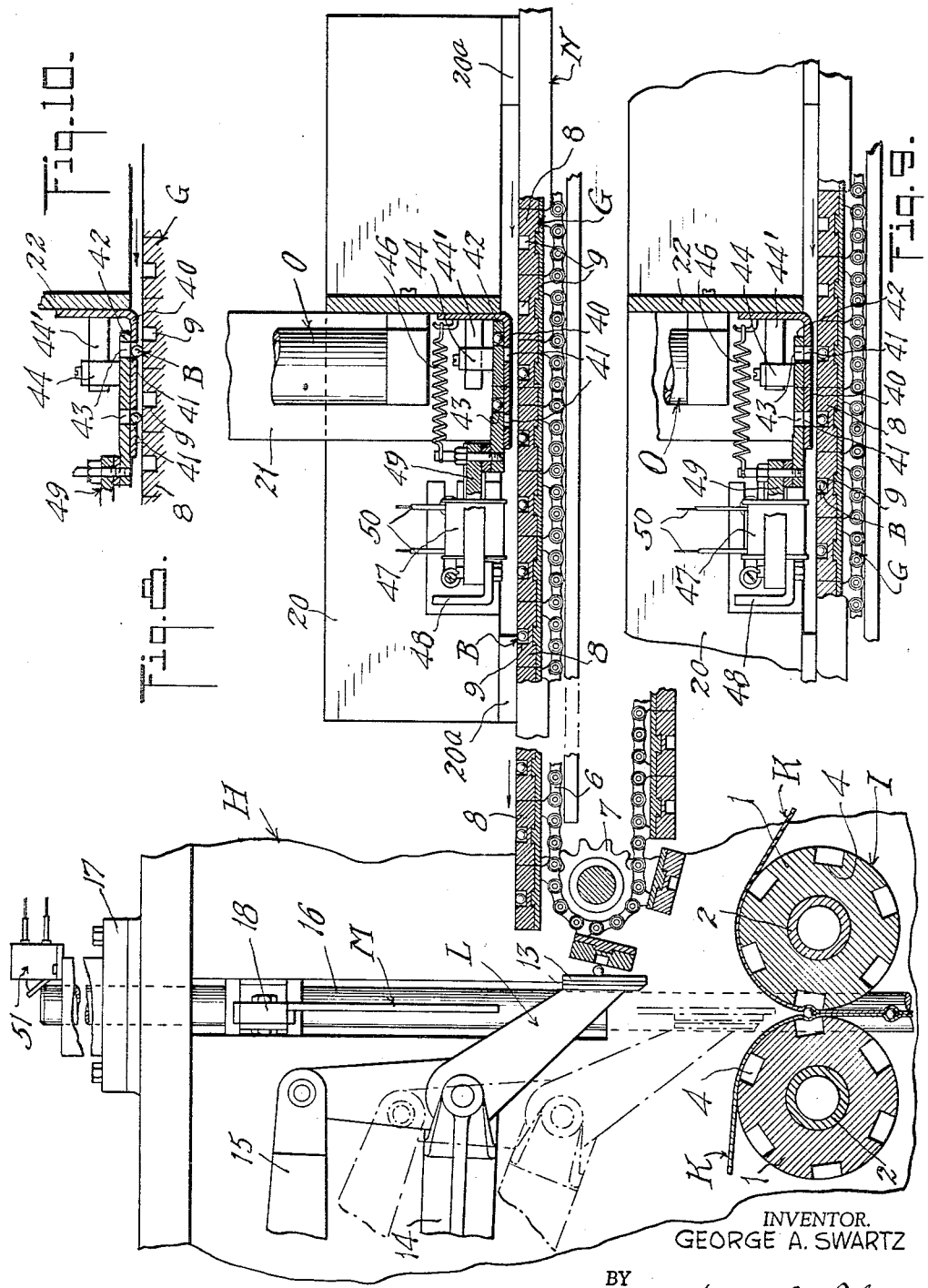

United States Patent Office 2,935,227
Patented May 3, 1960

2,935,227

CAPSULE FEEDING MECHANISM FOR PACKAGING MACHINES

George A. Swartz, Millington, N.J., assignor to Ivers-Lee Company, Newark, N.J., a corporation of Delaware Application August 27, 1958, Serial No. 757,476

2 Claims. (Cl. 221—179)

This invention relates in general to the feeding of elongated fragile small articles such as two-piece pharmaceutical capsules from a source of supply such as a hopper to a predetermined point such as a package in which the articles or capsules are to be enclosed.

More particularly, the invention contemplates such article or capsule feeding apparatus for use in conjunction with a packaging machine of the type disclosed in Patent No. 2,653,434, dated September 29, 1953, wherein two layers of flexible packaging material such as metal foil are drawn from supply rolls into juxtaposed closely spaced relation adjacent an article feeding and depositing mechanism which deposits the articles such as a capsule between the layers, after which the layers are sealed together around the articles in zones that form and bound pockets or compartments between the layers in which the articles are enclosed.

A machine such as described in said patent includes a conveyor for feeding articles to a predetermined point, a suction transfer head for transferring the articles in succession from said point to a position between said opposed layers of packaging material and a pusher reciprocable in timed relation to the movement of said transfer head to engage and follow said articles from the transfer head into position between the layers of packaging material.

A primary object of the present invention is to provide novel and improved apparatus for feeding and depositing the articles or capsules in succession, on such a conveyor preferably in timed relation to the movement of the conveyor and the transfer head.

Manifestly, in the handling of such odd shaped articles as elongated capsules, difficulty is encountered in arranging and feeding the articles in such a position that they may be individually and rapidly deposited on the traveling conveyor, and additional difficulty is encountered in individually separating the articles from a group or mass thereof such as would be found in a supply hopper, so that the articles may be deposited separately, accurately and in succession on the conveyor.

Therefore, another object of the invention is to provide in apparatus of the character described, a novel and improved combination of means for holding a large quantity of articles such as capsules disposed at random or in haphazard relation to each other, for example, in a supply hopper, and means for separating the articles one at a time from the group or mass and depositing them in succession at a predetermined point such as on a traveling conveyor.

A further object is to provide in such apparatus novel and improved means for simultaneously lifting a plurality of articles from the supply group and arranging them in end to end alignment in file formation so that they may be gravitationally fed to the desired point.

Another object is to provide in combination with means such as a chute, for gravitationally feeding the articles in file formation, novel and improved means for individually releasing the articles in succession from the file of articles.

Other objects, advantages and results of the invention will be brought out by the following description in conjunction with the accompanying drawings in which:

Figure 2 is a rear elevation thereof taken from approximately the plane of the line 2—2 of Figure 1;

Figure 3 is a fragmentary transverse vertical sectional view approximately on the plane of the line 3—3 of Figure 2 showing the article selecting mechanism in position to supply articles to the discharge chutes;

Figure 4 is a similar view showing the article selecting mechanism in the position to select articles from the supply hopper;

Figure 5 is a fragmentary rear elevation similar to Figure 2 showing the article pusher mechanism moving the articles from the selecting mechanism to the discharge chutes;

Figure 6 is an enlarged fragmentary top plan view approximately from the plane of the line 6—6 of Figure 1 of the article releasing mechanism and a portion of the conveyor of the packaging machine, showing the parts of the releasing mechanism in normal position to prevent release of the articles;

Figure 7 is a similar view showing the parts in position for releasing the articles from the files or chutes;

Figure 8 is a fragmentary vertical longitudinal sectional view approximately on the plane of the line 8—8 of Figure 6;

Figure 9 is a similar view on the plane of the line 9—9 of Figure 7;

Figure 10 is a fragmentary view similar to Figure 9 and illustrating a modification of the invention.

Figure 1:
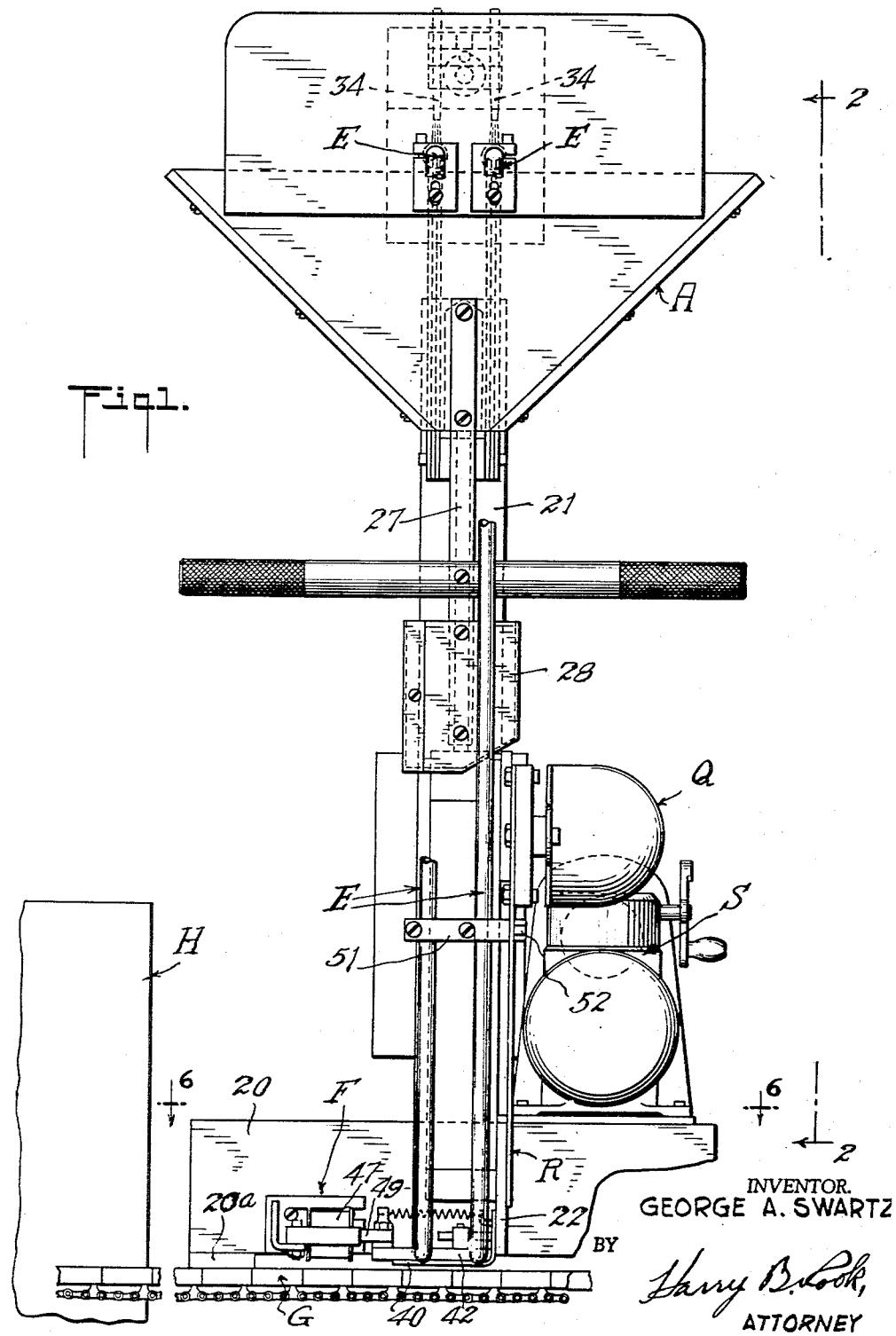
Figure 1 is a side elevation of apparatus for feeding articles, particularly elongated cylindrical capsules, embodying the invention.

Specifically describing the illustrated embodiment of the invention, the reference character A designates a hopper for holding a supply or group of articles, such as capsules B from which the articles, preferably a plurality thereof at one time, are selected and lifted above the mass of articles in the hopper by selecting mechanism generally designated C from which the articles are removed or pushed by an article pushing mechanism D into discharge chutes E through which the articles are gravitationally fed in file formation to article releasing mechanism F which controls the release of the articles from the chutes onto the conveyor G of a packaging machine of the general type shown and described in Patent No. 2,653,434. That machine is referred to primarily as illustrative of machines or other apparatus to which it may be desired to feed odd shaped articles of the general nature of capsules, and the machine is only fragmentarily and schematically shown in Figures 1 and 8.

It comprises a main frame or casing H on which is mounted sealing mechanism I of generally known type, for example such as shown in Patent No. 2,083,617, dated June 15, 1937, said sealing mechanism including two sealing rolls 1 mounted on and rotated in opposite directions by shafts 2 which are drivingly connected by gears, one of which may be driven by any suitable source of power. The rollers have complemental registering recesses 4 to provide clearance spaces between them for the articles B between the layers or webs K of packaging material which are drawn by and between the rolls 1, the recesses being spaced circumferentially of the rollers and the rollers being rotated in timed relation to deposit the articles between the layers. In surrounding relation to the recesses 4, the peripheries of the rollers have serrated surfaces for crimping the layers of packaging material and the rollers may be heated in any suitable manner where the packaging material is of heat-sealable type.

The articles to be packaged are placed on the feeding conveyor G which carries the articles to a suction transfer member L which is operated in timed relation to the movement of the articles by the conveyor so that each article is lifted from the conveyor by the transfer member and deposited between the layers of packaging material K, the articles being oriented and pushed from the suction transfer member by a pusher plate M.

The conveyor G is shown as comprising a pair of parallel chains 6 mounted in known manner on sprockets one of which for each chain is designated 7. On and between the chains are mounted a plurality of spaced article carrying blocks 8 each of which has a pocket or recess 9 for at least one article B. The conveyor is driven by any suitable means continuously so as to bring the blocks with their respective articles into juxtaposition to the suction head 13 of the transfer mechanism so that the latter may move the article from the pocket.

The suction head 13 is pivotally connected to a suction pipe 14 which is connected in any suitable manner to a suitable suction producing apparatus and the suction head is swung up and down and simultaneously horizontally by an arm 15 which is pivotally connected at one end to the suction pipe 14 and is fast connected at its other end to a cam shaft journaled in the machine frame and actuated by a cam (not here shown) but clearly illustrated and described in said patent.

The pusher plate M may be formed of any suitable material that will not damage the articles and is carried by a rod 16 vertically reciprocable in bearings 17 on the machine frame and carrying an arm 18 to which the pusher plate is connected, and the rod 16 is reciprocated by a cam and follower mechanism which is not here shown but is shown and described in said patent and is actuated by a suitable source of power in timed relation to the movement of the transfer mechanism L and the conveyor G.

The article feeding apparatus embodying the invention is preferably separable from and adjustable on the upper surface of a table N that forms a portion of the machine frame in which the conveyor G is mounted, and as shown, the feeding apparatus comprises a base piece 20 having feet 20a to slidably rest on the table N, one base piece having an upright or post 21 rigidly connected thereto intermediate the end of the base piece to which is rigidly connected in approximately perpendicular relation thereto, a secondary base piece 22. The base piece 22 also has a foot 23 to slidably rest on the table N.

The post 21 has a vertical guide 24 for one end of a vertically reciprocable cross head 25, and a similar guide 26 is mounted on a support piece 27 that is in spaced parallel relation to the post 21 and is rigidly connected to the post by tie plates 28. The cross head 25 is actuated by a reciprocating double acting fluid motor O, through a piston rod 25a of the piston of said motor, the upper end of which is connected to the cross head.

The cross head and motor comprise parts of the article selecting mechanism C which also is shown as including two article selector elements 29 (although one or more of such elements might be utilized) that are rigidly connected at their lower ends to the cross head as indicated at 30 and have concave longitudinal horizontal seats 31 at their upper edges to receive the articles B. The elements are vertically reciprocable through openings 32 at the bottom of the hopper at opposite sides of a deflector block 33. Conveniently the selector elements may comprise two spaced thin plates 29a that are rigidly secured together by welding or rivets 29b and have their upper edges downwardly converging to provide the seats 31. The plates are of sufficient length to extend from the bottom of the hopper as shown in Figure 4 to a point above the upper edge of the hopper as shown in Figure 3 and it will be observed that when the plates are in their lower-most position as shown in Figure 4, the edges thereof are disposed within the mass of the articles B and that when the selector elements are moved upwardly out of the mass a plurality of the articles will be seated on the seats 31 in alignment with each other in file formation as best shown in Figures 3 and 5.

While the selector elements are in their uppermost position as shown in Figures 3 and 5, the articles are pushed longitudinally in line from the seats 31 by a pusher 34, preferably including brush bristles 35, slidably mounted on a guide rod 36 secured to the side of the hopper and actuated by the piston rod 37 of a double acting reciprocating fluid motor P which is also rigidly mounted by a bracket 38 on the side of the hopper.

As above explained, the capsules are pushed in file formation into the chutes E which are shown as comprising tubes, the inlet end of each of which is horizontally disposed in alignment with the seat 31 of one of the separator elements 29 when the latter is in its uppermost position as best shown in Figures 1 and 2. The lower ends of the tubes are also horizontally disposed, each to discharge its articles to the article releasing mechanism F. This mechanism is shown as comprising a main plate 40 mounted on the secondary base piece 22 and having a portion in spaced parallel relation to the upper reach of the conveyor G and provided with a discharge aperture 41 for the articles in each chute. An escapement plate 42 is slidable on the upper surface of the main plate 40 and has an escapement notch 43 to coact with each of the discharge apertures 41, the escapement plate being shown as guided by an arm 44 on the plate that is slidable on a guide stud 44′ rigidly secured to the vertical portion of the main plate or to the base piece 22. A tension spring 46 normally urges the escapement plate in one direction, to the right in Figures 6 and 8 so as to bring the escapement notches 43 out of alignment with the discharge apertures 41 as shown in Figures 6 and 8. The escapement notches 43 open through one edge of the escapement plate as best shown in Figures 6 and 7 and normally are in alignment with the discharge ends of the corresponding chute as shown in Figure 6, but upon sliding of the escapement plate in the other direction, to the left in Figures 6 and 8 the escapement notches are brought into alignment with the corresponding discharge apertures to release the articles in the notches through said apertures to the conveyor G, and at the same time the edge portions 45 and 45′ of the plate are brought into close juxtaposition to the discharge extremities of the corresponding chutes so as to interrupt or stop movement of the articles from the chutes as shown in Figure 7.

Movement of the escapement plate in the second mentioned direction to release the articles is shown as effected by a solenoid 47 that is mounted on an auxiliary bracket 48 and the armature 49 of which is connected to one end of the escapement plate. Energization of the armature 49 may be effected in any suitable manner but as shown, the solenoid is connected in circuit by wires 50 with a microswitch 51 which is actuated by the rod 16 of the pusher plate M. Obviously if desired, the escapement plate might be manually operated under some conditions.

While the capsules are shown in Figures 8 and 9 as being dropped directly into the pockets 9 of the conveyor, it may be desirable in some cases in order to avoid occasional crushing of an article, to permit the article to drop initially onto the surface of the conveyor as shown in Figure 10 in advance of the pocket 9 into which the article is to be deposited, as shown in Figure 10 so that the article is momentarily held against movement by the main plate 40 as the conveyor moves forwardly until the pocket becomes located beneath the article, whereupon the article drops into the pocket as shown in Figures 8 and 9.

It is also desirable to provide means for vibrating the chutes E to insure free movement of the articles through the chutes, and as shown, a known type of electrical vibrator Q is mounted on a bracket plate R which is rigidly secured at 50 to the secondary base piece 22. The chutes E are rigidly but adjustably connected to said bracket plate by a tie piece 51 that connects the two chutes and is rigidly but adjustably connected to the bracket plate by bolt and slot connections 52.

The motors O and P for the cross head 25 and the pusher mechanism, respectively, are shown as operated from the same source of fluid pressure which may be supplied through an inlet pipe 53 to a suitable rotary valve mechanism 54 that has a cylinder rotatable in a casing by known type of an electric motor and gear reduction unit S, commonly called a variable speed drive. The valve controls the flow of fluid at the proper time from the inlet 53 through one tube 55 to one end of the motor P and simultaneously controls the exhaust of the fluid from the opposite end of the cylinder through the other tube to the outlet or exhaust 57 of the valve. The valve 54 also controls the flow of fluid from the inlet through one of the tubes 58 to one end of the motor O and simultaneously controls the exhaust of the fluid from the other end of said motor through the other tube 58 to the valve exhaust 57.

Other means could be utilized for elevating the selectors 29 above the mass of articles in the hopper and for actuating the pusher 34 in timed relation thereto for displacing the articles from the separators into the chutes when the articles are raised out of the hopper by the selectors.

While the invention has been shown and described as embodied in certain structural details, it should be understood that the construction of the article feeding apparatus may be widely modified and changed and the feeding apparatus may be used in connection with other types of machines, all within the spirit and scope of the invention.

What I claim is:

1. Apparatus for feeding elongated articles from a mass thereof wherein the articles are disposed in haphazard relation to each other, to a horizontal portion of a machine for packaging the articles, said apparatus comprising a frame, a hopper on said frame for holding said mass of articles, apparatus for feeding said articles from said hopper in succession to said horizontal portion of the packaging machine including a feed chute on said frame having inlet and outlet ends to receive and guide said articles therethrough in end-to-end and file formation and having its inlet end adjacent said hopper, article selecting and lifting mechanism including a selector element vertically movable through said mass of articles and having an elongate horizontal concave seat to receive and gravitationally dispose a plurality of articles therein in end-to-end relation upon movement of the selector element upwardly through said mass of articles and into alinement with said inlet end of said chute, a pusher mechanism for pushing said articles in end-to-end file formation from said selecting and lifting mechanism into the inlet end of said chute, means for operating said selecting and lifting mechanism and said pusher mechanism in timed relation to each other, and means for releasing articles in succession from the outlet end of said chute to drop by gravity onto said horizontal portion of the packaging machine including a reciprocable escapement plate, and means for causing reciprocation of said escapement plate, said means for releasing said articles including a main plate having a discharge aperture and on and above which said reciprocable plate is slidable, said escapement plate having a slot therethrough opening through one edge thereof, said slot being brought into register with said outlet of the chute upon movement of said escapement plate in one direction to receive an article from the chute, and upon movement of the escapement plate in the opposite direction said edge of the escapement plate being brought into juxtaposition to the outlet of said chute to prevent escape of articles from the chute and said slot being brought into register with said discharge aperture to discharge the article through said discharge aperture onto said conveyor portion.

2. Apparatus for feeding elongated articles from a mass thereof wherein the articles are disposed in haphazard relation to each other, to a horizontal portion of a machine for packaging the articles, said apparatus comprising a frame, a hopper on said frame for holding said mass of articles, apparatus for feeding said articles from said hopper in succession to said horizontal portion of the packaging machine including a feed chute on said frame having inlet and outlet ends to receive and guide said articles therethrough in end-to-end and file formation and having its inlet end adjacent said hopper, article selecting and lifting mechanism including a selector element vertically movable through said mass of articles and having an elongate horizontal concave seat to receive and gravitationally dispose a plurality of articles therein in end-to-end relation upon movement of the selector element upwardly through said mass of articles and into alinement with said inlet end of said chute, a pusher mechanism for pushing said articles in end-to-end file formation from said selecting and lifting mechanism into the inlet end of said chute, means for operating said selecting and lifting mechanism and said pusher mechanism in timed relation to each other, and means for releasing said articles in succession from the outlet end of said chute to drop by gravity onto said horizontal portion of the packaging machine including a reciprocable escapement plate, and means for causing reciprocation of said escapement plate, said horizontal portion of the machine comprising a continuously moving conveyor having pockets spaced longitudinally thereof, and said means for releasing said articles including a main plate spaced from said conveyor a distance less than the diameter of said articles and having a discharge aperture and on and above which said reciprocable escapement plate is slidable, said escapement plate having a slot therethrough opening through one edge thereof, said slot being brought into register with said outlet of the chute upon movement of said escapement plate in one direction to receive an article from the chute, and upon movement of the escapement plate in the opposite direction said edge of the escapement plate being brought into juxtaposition to the outlet of said chute to prevent escape of articles from the chute and said slot being brought into register with said discharge aperture to deposit the article through said discharge aperture into contact with the conveyor portion so that as the conveyor moves, the article will gravitationally drop from said discharge aperture into a pocket in said conveyor.

References Cited in the file of this patent

UNITED STATES PATENTS

| 730,643 | Hance | June 9, 1903 |
| 1,262,117 | Smith | Apr. 9, 1918 |
| 1,536,833 | Fagon et al. | May 5, 1925 |
| 2,341,014 | Blair | Feb. 8, 1944 |
| 2,409,725 | Whitmore et al. | Oct. 22, 1946 |
| 2,653,434 | Salfisberg | Sept. 29, 1953 |

FOREIGN PATENTS

| 220,249 | Great Britain | Aug. 14, 1924 |
| 701,848 | Great Britain | Jan. 6, 1954 |